March 23, 1943.  J. W. INNES  2,314,788
WELDING JIG
Filed May 22, 1941  3 Sheets-Sheet 1

Inventor:
John William Innes
By: John Howard Smith
Atty.

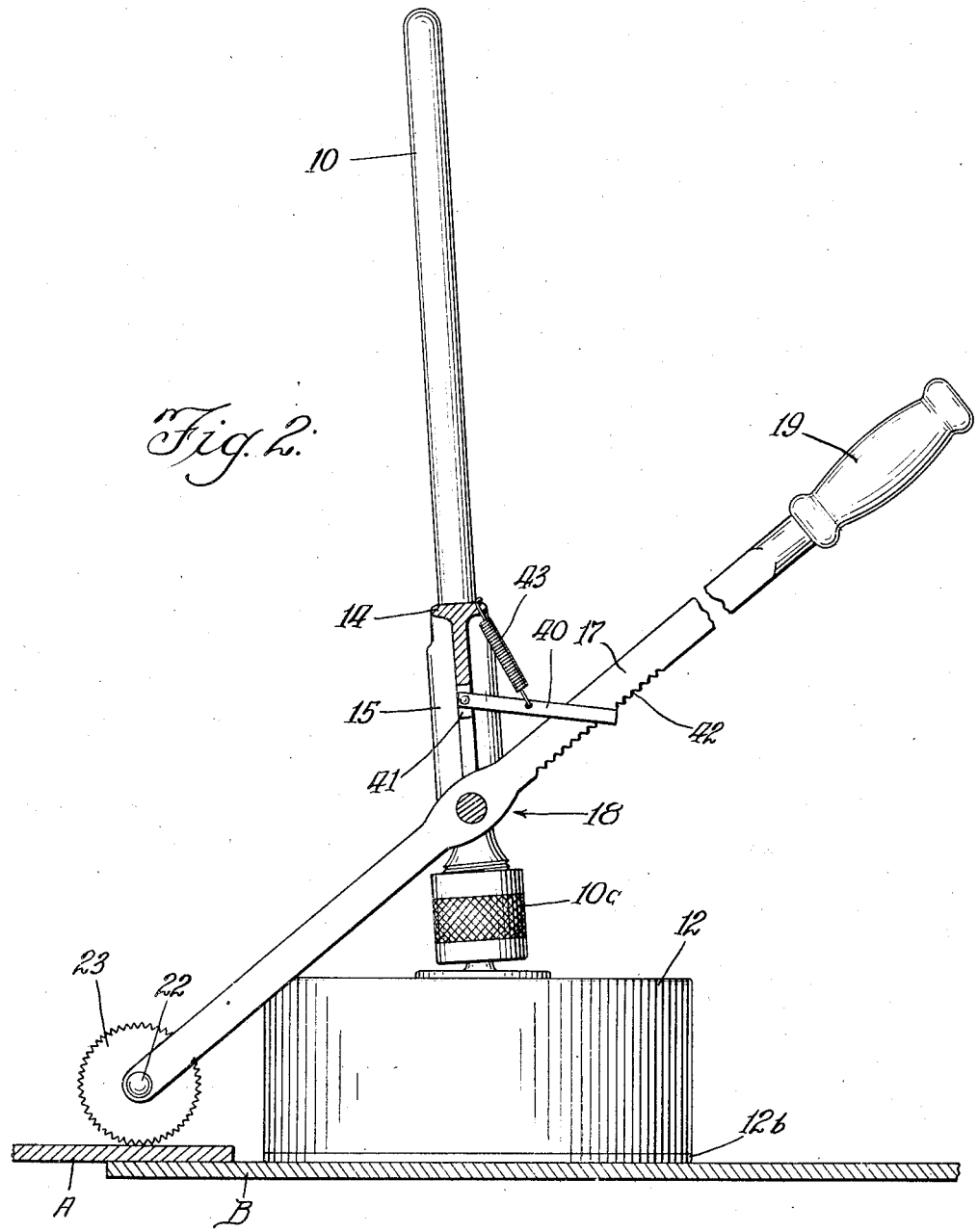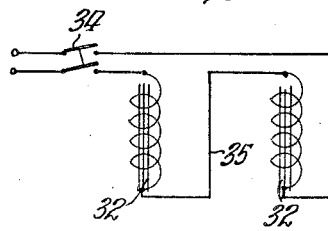

March 23, 1943. J. W. INNES 2,314,788
WELDING JIG
Filed May 22, 1941 3 Sheets-Sheet 3

Inventor
John William Innes
By John Howard Smith
Atty.

Patented Mar. 23, 1943

2,314,788

UNITED STATES PATENT OFFICE 2,314,788

WELDING JIG

John William Innes, Philadelphia, Pa.

Application May 22, 1941, Serial No. 394,629

12 Claims. (Cl. 113—99)

My invention relates to a welding jig adapted to facilitate the manipulation of two or more elements which are to be secured together by any well known welding process.

Jigs of the above general character have been used heretofore, however the shapes of the metal pieces to which they are adaptable have been limited and the fitting up of these prior devices preparatory to the welding operation has been a cumbersome operation requiring considerable skill and manipulation. In some instances the prior known jigs, to be used in conjunction with flat plates, must be augmented by additional fixtures which are also welded to these plates prior to the main welding operation which joins the two.

One of the important objects of the invention is to provide a jig which is entirely self contained, that is, which requires no additional parts or welded pieces for its adaptation to a construction, such as a plurality of metal pieces which are to be welded together.

Still another object of the invention is to provide a device of the above character which may be adjusted, placed in operating position, and operated with a minimum of skilled effort and in a minimum period of time.

Still another object of the invention is to provide a device of the above character which may be readily adapted to plates or elements having irregular shapes or surface curvatures without readjustment or exchange of the grappling elements.

More specifically, it is an object of the invention to provide a device of the above character which engages the elements to be welded on a common side, thus obviating the necessity for providing means to back up the holding means through the plane of the seam or spot to be welded.

Another advantage of the invention is the simplicity of operation afforded by the use of electricity as the grappling agency whereby, after positioning the jig, the mere operation of a switch places the device in readiness for drawing the metal objects together preparatory to the welding operation.

Still another object of the invention is to provide an adjustment whereby the device may be readily and easily adapted to materials having a wide variety of vertical dimensions.

Other objects and advantages of my invention will become apparent from the following specification and accompanying drawings, in which:

Fig. 2 represents a cross section taken on the line 2—2 of Fig. 1;

Fig. 4 is a diagrammatic view of the circuit through the grappling elements.

It is to be understood that the embodiment shown herein is illustrative and may be changed or modified without departing from the scope and spirit of the invention as set forth in the appended claims.

Figure 1:
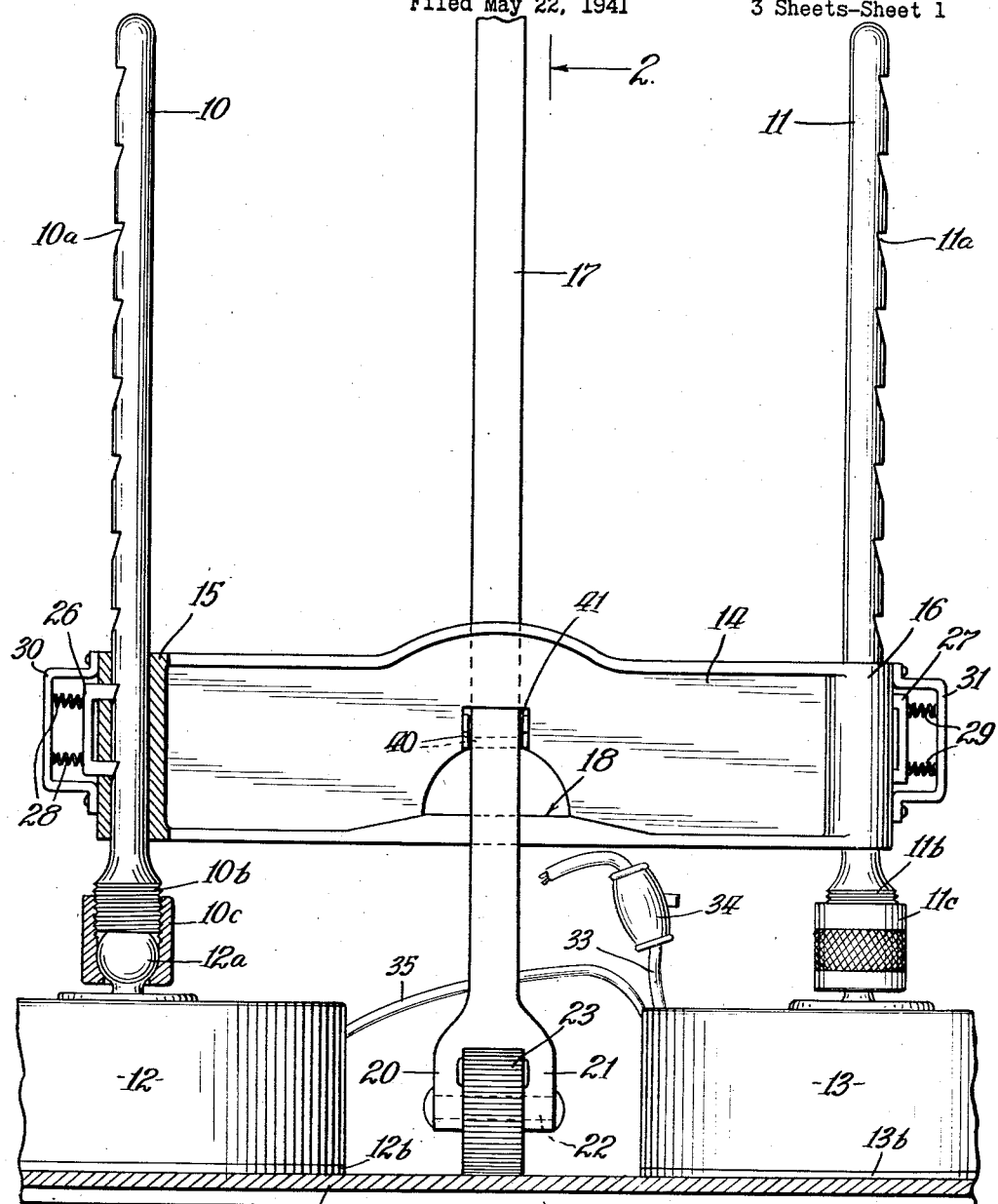
Fig. 1 represents a front elevational view of the device being applied to a pair of flat plates.
Figure 3:
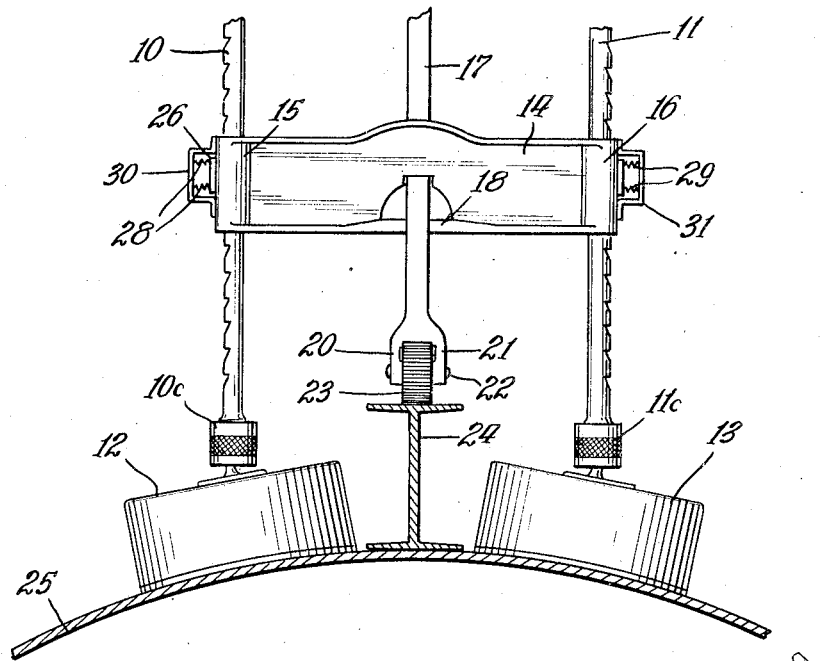
Fig. 3 represents a front elevational view of the device being applied to an I-beam which is to be welded to a plate having a curvature.

Referring to the drawings, particularly to Figs. 1 to 3, the device generally consists of a supporting structure comprising a pair of standards 10 and 11 mounted on a grappling assembly including electromagnetic grappling elements 12 and 13 respectively. The supporting structure comprises further, a bridge element 14 which extends between the standards 10 and 11 and has slideways 15 and 16 adapted to receive the respective standards in sliding relationship. An operating lever 17 is suitably secured to the bridge 14 in pivotal relationship thereto, as shown at 18. The lever 17 has a suitable gripping element 19 at the upper end thereof, and is bifurcated at its lower end to form a pair of arms 20 and 21 which are suitably drilled to receive a cross pin 22 upon which is rotatably mounted a preferably toothed wheel 23 of hardened steel. From Figs. 1 and 2 it will be seen that if a pair of plates A and B are to be welded together at an overlapping marginal portion, such as is shown in Fig. 2, the device may be placed upon the plate B, and when the electromagnets within the grappling elements 12 and 13 are energized the handle 19 may be raised, thereby operating the lever about the pivot 18 to depress the toothed wheel 23 against the plate A to urge it against the plate B with considerable pressure, whereupon the entire assembly is in readiness for the welding operation to join the aforementioned plates.

In the event that a single operator is to accomplish the aforementioned manipulations and also is required to do the welding, it will be seen that release of the lifting pressure on the gripping element 19 will permit a reverse pivotal action of the lever 17 about the pivot 18 and a consequent release of the working pressure by upward movement of the wheel 23. In order that once the aforementioned pressure adjustment has been made this pressure will be maintained without further attention from the operator, I have p vided herein a locking element 40 which may comprise a U-shaped piece of steel which has its ends secured in an aperture 41 of the bridge 14 and is free to rock about its ends rearwardly of the bridge element and around the rear face of the lever 17. The rear face of the portion of the arm 17 which bears against the extremity of the U-shaped lock 40 is finely serrated as at 42, the position of these serrations being such that the locking member 40 will engage the same throughout the upward movement of the gripping element 19 of the lever, this being accomplished by the spring 43 suitably anchored to the element 14. Thus it will be seen that as the welding pressure is applied by upward movement of the gripping element 19 the U-shaped locking member will rise under the spring action and be gripped by the serrations 42 in its progressively lower position until the required amount of pressure has been applied by the depression of the wheel 22. Under these circumstances the pressure applied by the aforementioned manipulation will be retained without further attention on the part of the operator and he is then at liberty to utilize the welding apparaus to complete the welding operation. It will be understood, of course, that should the lever 17 be so constructed that it affords a slight flexing action, the engagement and reengagement of the element 40 with the serrations 42 will be greatly facilitated.

By reference to Fig. 3 it will be seen that as distinguished from the application of the device to flat plates A and B, two peculiar conditions are presented by the welding of the much deeper I-beam 24 to the curved plate 25.

The first difficulty encountered is the greatly increased vertical depth of the I-beam as compared to the depth of the plates A and B shown in Figs. 1 and 2. This increase in depth, of course, eliminates most or all of the leverage action available by manipulation of the handle 19.

In order to overcome the above difficulty a novel construction of the standards 10 and 11 together with the slideways of the bridge 14 is provided. As is shown in Fig. 1, the standards 10 and 11 are provided with notches or detents 10a and 11a, respectively, throughout their length, each of these notches having a downwardly extending escapement face and a substantially horizontally extending locking face at its upper end. The outermost walls of the slideways 15 and 16 are suitably drilled to receive two arms of substantially U-shaped pawls 26 and 27 respectively, the inwardly extending arms thereof being adapted to engage in the notches 10a and 11a respectively to prevent upward movement of the bridge 14. These pawls 26 and 27 are inwardly urged by springs 28 and 29 respectively, the remote end of said springs engaging any suitable means such as protective strips 30 and 31 respectively.

From the foregoing it will be seen that the height of the bridge may be adjusted in accordance with the vertical depth of the materials to be urged together prior to the welding operation, and that a raising of the bridge 14 is afforded by the mere withdrawal of the pawls 26 and 27 against the action of springs 28 and 29.

As will also be seen from Fig. 3, the device is so constructed that a curved surface may be engaged by the electromagnetic grappling elements with a substantial face-to-face contact, thereby eliminating the loss of the electromagnetic draw between the grappling elements 12 and 13 and the surface of the curved member 25. This is accomplished by the nature of the connection between the standards 10 and 11 and the grappling elements 12 and 13 respectively. As will be clearly seen from Fig. 1, the standards 10 and 11 are threaded at their lower ends as at 10b and 11b respectively. Cap elements 10c and 11c respectively are inwardly threaded to engage the threads 10b and 11b, said caps having a reduced opening at their lower end to receive the neck of a ball element such as that shown at 12a, thereby affording a universal connection between the grappling elements and the standards. It will be readily understood that the caps 10c and 11c may be loosened while the lower surface of the grappling elements is being conformed to the curvature of the material to be worked upon, whereupon they may be again tightened to lock the ball 12a against the lower ends of the standards.

As previously stated, the grappling elements 12 and 13 engage the materials to be worked upon electromagnetically. Internally these grappling elements are provided with a conventional electromagnet construction which utilizes a laminated core shown diagrammatically at 32 in Fig. 4, the contacting plates 12b and 13b constituting the keeper plates therefor. The energizing current enters the grappling element 13 through conduit 33 after passing through switch 34, while the energizing current is provided to the grappling element 12 through conduit 35. Thus by mere operation of the switch the elements 12 and 13 are made effective or ineffective, as desired.

Figure 5:
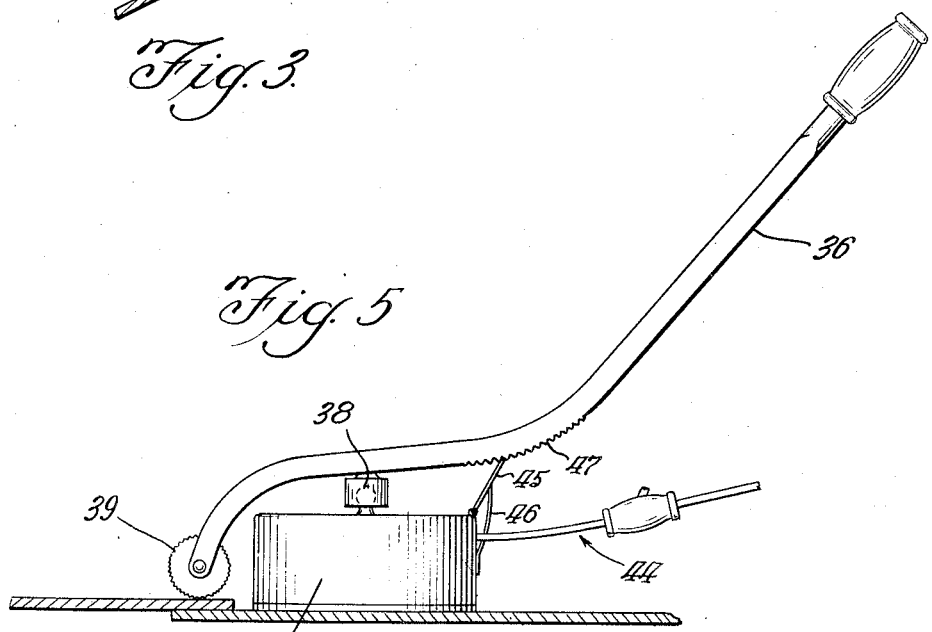
Fig. 5 represents a side elevational view of a modified form of the invention.

If desired, a less complex construction such as that shown in Fig. 5 may embody the present invention. In the modification shown the device constitutes merely a lever 36 adapted to be manipulated from its upper end, this lever having a single electromagnetic grappler 37 pivotally or universally secured thereto as at 38, while the lower end of the lever carries a rotatable serrated gripping wheel 39. A suitable switch and conduit as shown at 44 may be provided.

This construction may also be provided with a locking device which includes a pawl 45 urged upwardly by a leaf spring 46 against the serrations 47 so that a single operator may use the device.

From the foregoing it will be seen that I have provided a welding jig which may be utilized under a wide variation of circumstances determined by a variety of shapes and sizes of the materials to be drawn together. The device may be adapted to fit these varying conditions with a minimum of skilled manipulation and with great rapidity. Furthermore, the device when once set for the welding operation may be left by the operator and will continue to retain its gripping action upon the members to be welded.

What I claim is:

1. In an apparatus of the class described, the combination of an electromagnetically energized grappling assembly, means for energizing said grappling assembly to attach the same to an object to be welded, work engaging means adapted to abut an object to be welded to that attached to the grappling assembly, and a pivotal lever connection for operatively securing said work engaging means to said grappling assembly, said connecting lever having an operating portion for manipulating said work engaging element and said grappling assembly in opposed directions to draw together the objects to be welded.

2. In a device for aligning and securing together objects which are to be welded to one another, the combination of electromagnetically energized means for grappling a metallic object when energized, a work engaging element for urging a metallic object against said first named object, a supporting assembly mounted on said grappling means, said assembly including substantially upright means upstanding of said grappling means, a universal joint connection between said grappling means and said upright means, means associated with said universal joint for locking the same in a predetermined rigid position with respect to said grappling means, a supporting element mounted on said upright means and in sliding relationship thereto, means for locking said supporting element in a predetermined position on said upright means, and an operating lever pivotally secured to said supporting means, said lever being formed at one end to carry said work engaging element.

3. In a device for aligning and securing together objects which are to be welded to one another, the combination of electromagnetically energized means for grappling a metallic object when energized, a work engaging element for urging a metallic object against said first named object and in a direction opposed to the pull of said electromagnet means, a supporting assembly mounted on said grappling means and extending substantially upward of said means, and an operating lever pivotally secured to said supporting assembly, said lever carrying at one end said work engaging element.

4. In a device for aligning and securing together objects which are to be welded one to another, the combination of electro-magnetically energized means for grappling a metallic object when energized, a work engaging element for urging a metallic object against said first named object, a supporting assembly mounted on said grappling means, and extending substantially upward of said means, a supporting element mounted on said supporting assembly for relatively vertical sliding movement relative thereto, means for locking said supporting element in a predetermined relative position, and an operating lever pivotally secured to said supporting element, said lever carrying at one end said work engaging element.

5. In a device of the character described, in combination, a plurality of electromagnetically energized grappling elements, a substantially upwardly, vertically extending supporting element secured to each of said grappling elements, a bridge element extending between each of said upright elements, an operating lever pivotally secured to said bridge element, a work engaging element secured at one end of said lever, said work engaging element being adapted to be urged against a metallic object by manipulation of the remote end of said lever, and means associated with said device for engaging said lever as it is so manipulated to lock it in a non-receding position to retain said work engaging element under pressure against said metallic object.

6. In a device of the character described, in combination, a plurality of electromagnetically energized grappling elements, a substantially upwardly, vertically extending supporting element secured to each of said grappling elements, a bridge element extending between each of said upright elements, an operating lever pivotally secured to said bridge element, a work engaging element secured at one end of said lever, said work engaging element being adapted to be urged against a metallic object by manipulation of the remote end of said lever, and means associated with said device for engaging said lever as it is so manipulated to lock it in a non-receding position to retain said work engaging element under pressure against the object it engages.

7. In a device of the character described, the combination of electromagnetically energized means for grappling a metallic object when energized, a work engaging element for urging a metallic object against said first named object, a supporting assembly associated with said grappling means, a universal connection between said means and said supporting assembly, a lever pivotally secured to said supporting assembly, said lever being adapted to carry said work engaging element at one end, and means associated with said device for engaging said lever as it is so manipulated to lock it in a non-receding position to retain said work engaging element under pressure against the object it engages.

8. In a device of the class described, in combination, a grappling assembly for grappling a metallic object when energized, work engaging means adapted to be urged against another metallic object to press the same against the first named object, operable means for carrying said work engaging element toward and away from the object it engages, a supporting assembly associated with said grappling assembly, means for operatively securing said operable means to said supporting assembly, and locking means for engaging said operable means to lock it in a non-receding position as said work engaging element is urged against the object which it engages.

9. In a device of the class described, in combination, a grappling assembly for grappling a metallic object when energized, work engaging means adapted to be urged against another metallic object to press the same against the first named object, operable means for carrying said work engaging element toward and away from the object it engages, a supporting assembly associated with said grappling assembly, means for operatively securing said operable means to said supporting assembly, said supporting assembly including substantially vertical uprights extending upwardly of said grappling assembly and a bridge element extending between said uprights, the ends of said bridge element having a sliding engagement with said uprights for vertical adjustment relative thereto, and means for locking the ends of said bridge element at predetermined vertical positions on said uprights.

10. In a device of the class described, in combination, electromagnetically energized grappling means, work engaging means, a supporting structure associated with said grappling means for operatively supporting said work engaging means whereby the latter may be urged against a metallic object to press it against an object to which the grappling means is secured when it is energized, and a universal joint connection between said grappling means and said supporting structure.

11. In a device for aligning and securing together objects which are to be welded to one another, the combination of electromagnetically energized means for grappling a metallic object when energized, a non-magnetic work-engaging element for urging a metallic object against said first named object and in a direction opposed to the pull of said electromagnetic means, a supporting assembly associated with said grappling means and extending substantially upwardly thereof and means secured to said supporting assembly carrying at one end said work-engaging element and being constructed and arranged to move said work-engaging element toward and away from the plane passing through the junction of said grappling element and the object it engages.

12. In a device for aligning and securing together objects which are to be welded to one another, the combination of magnetic means for grappling a metallic object, a work-engaging element for urging a metallic object against said first named object and in a direction opposed to the pull of said magnetic means, a supporting assembly mounted on said grappling means and extending substantially upward of said means, and means secured to said supporting assembly carrying at one end said work-engaging element and being constructed and arranged to move said work-engaging element toward and away from the plane passing through the junction of said grappling element and the object it engages.

JOHN WILLIAM INNES.